Patented Nov. 6, 1951

2,573,959

UNITED STATES PATENT OFFICE 2,573,959

DRILLING FLUIDS

Paul W. Fischer, Long Beach, Calif., assignor to Union Oil Company of California, Los Angeles, Calif., a corporation of California No Drawing. Application February 24, 1948, Serial No. 10,559

19 Claims. (Cl. 252—8.5)

This invention relates to drilling fluids employed in the drilling of oil, gas, water, or brine wells by means of rotary drilling tools. More particularly this invention relates to an improved type of oil-base drilling fluids which in addition to having the desirable properties of low filtration rate and optimum viscosity has highly improved thixotropic properties which are of the utmost importance in suspension of drill cuttings and weighting agents.

In drilling an oil or gas well by means of rotary drilling tools, a hollow drill pipe known as a drill stem having a bit attached to the lower end is extended downwardly through the well bore and rotated while the bit is pressed against the working face in the formation at the bottom of the hole. The action of the rotating bit grinds away the formation as the drilling progresses. A fluid, commonly termed a drilling mud, is circulated downwardly through the drill stem, through the bit against the working face of the hole, and then upwardly toward the surface through the annular space between the drill stem and the wall of the borehole. This drilling fluid serves a number of purposes among which are cooling and lubricating the drill bit, suspending and removing cuttings from the borehole, sealing the borehole wall to prevent loss of drilling fluid into the surrounding formation, preventing the flow of fluids from the formation into the borehole by applying a hydrostatic pressure to the formation, and fulfilling other requirements.

Drilling fluids commonly employed in rotary drilling may be roughly divided into the water-base and the oil-base classes, each of which has desirable properties. The present invention is primarily directed toward improved oil-base drilling fluids which are formulated to possess the inherently desirable thixotropic properties of the conventional water-base drilling fluids.

Conventional oil-base drilling fluids are prepared from a hydrocarbon material such as naphtha, intermediate oils, heavy oils and asphalt. These have, in general, very low filtration rates and viscosities which are fairly easily regulated to the desired value. The conventional fluids are, however, generally lacking in gel strength which determines the degree to which suspended weighting agents or drill cuttings settle out of the fluid. Conventional water-base muds containing appreciable quantities of a hydratable clay are characterized by high gel strength and will suspend large quantities of weighting agents. The usual oil-base fluids will not suspend any appreciable quantities of weighting agents because of their inherently poor gel strength. This drawback has been eliminated in the oil-base drilling fluids of the present invention in which stable suspensions of weighting agents may be prepared.

This invention is primarily directed therefore to oil-base drilling fluids which inherently have highly desirable thixotropic properties which are ordinarily characteristic only of the conventional water-base drilling fluids containing substantial quantities of clay.

It is a primary object of this invention to provide an improved oil-base drilling fluid having improved thixotropic properties and improved gel strength.

Another object of this invention is to provide an oil-base drilling fluid which comprises an unusually stable emulsion of improved high gel strength which permits the stable suspension of high concentrations of weighting agents and permits the efficient suspension of drill cuttings.

Another object of this invention is to provide an improved oil-base drilling fluid which possesses the desirably low filtration rates characteristic of some oil-base fluids with the reversible thixotropic properties of the conventional water-clay fluids.

A further object of this invention is to provide an improved drilling fluid which in addition to its desirable thixotropic properties has a filtration rate of substantially zero, a readily variable viscosity, and is easily circulated through the hole.

Other objects and advantages of this invention will become apparent to those skilled in the art as the description thereof proceeds.

Briefly, the present invention comprises an improved oil-base drilling fluid which is particularly characterized by its highly desirable reversible thixotropic properties or its high gel strength together with very low filtration rate. These improved oil-base drilling fluids comprise emulsions of water in oil specially prepared with emulsifying agents which impart wall building properties to and reduce the filter loss of the drilling fluid. The oil employed may comprise two grades of oil balanced in quantity with respect to each other to control the viscosity of the resulting fluid within the desired limits. The highly desirable properties of reversible thixotropy are imparted to the fluid by addition of gelation agents which tend to form gels in the fluid when the fluid is subject to low rates of shear and to form a free flowing fluid at high rates of fluid shear. Thus, weighting agents and drill cuttings are easily and stably suspended by this fluid in the hole regardless of the rate of circulation and permit the easy separation of the drill cuttings from the fluid at the surface in the settling troughs or slush pits. These drilling fluids further are attributed with unusually low filtration rates and readily controlled viscosities so that they comprise highly desirable fluids for use in the rotary drilling of well bores.

The improved drilling fluids of this invention are particularly successful since they have the proper physical properties to enable them to perform satisfactorily and fulfill the requirements needed in well bore drilling. The filtration rates are low showing an excellent ability of the drilling fluid to seal the borehole walls against fluid loss into the formation and to some extent the passage of fluid in the reverse direction into the well. The viscosity of these fluids is within a desirable range and the fluids are easily handled and pumped through the hole. The physical property which most clearly differentiates the improved drilling fluids of this invention from the conventional oil-base drilling fluids proposed previously is the gel strength which determines the ability of the drilling fluid to suspend weighting agents and material broken out of the formation by the action of the drill bit. Thus, a weighted oil-base fluid may be prepared according to this invention for use in drilling into high pressure formations. This improved drilling fluid fulfills the requirements of well boring and after thorough laboratory and field testing has been found to be a highly desirable and successful drilling fluid.

The ability of the drilling fluid to effectively seal the wall of the borehole may be determined by means of a simple filtration test in which the drilling fluid is pressed under pressure against a permeable membrane or filter. The quantity of filtrate obtained under certain standard conditions of pressure and temperature is a measure of the wall sealing ability of the mud, a property which is also termed the cake forming, filter loss, sealing, or filtration characteristics. Such a standardized procedure for determination of the filtration rate is prescribed in "Recommended Practice on Field Procedure for Testing Drilling Fluids," A. P. I. Code No. 29, second edition, published July 1942.

A measure of the ease with which the drilling fluid may be circulated through the hole during drilling is indicated by the viscosity. A viscosity determination may be made by following a standardized procedure given in "Recommended Practice on Field Procedure for Testing Drilling Fluids" A. P. I. Code No. 29, second edition, published July 1942. The property thus obtained is known as the Marsh viscosity or the funnel viscosity and is given by the time in seconds required for a volume of fluid to pass through the restricted opening of the bottom of a standard-size funnel. In field practice 1500 ml. of drilling fluid is measured into the funnel and the viscosity is given by the time in seconds required for one quart to run out. In the laboratory, 500 ml. of the mud is placed in the funnel and the time required for the material to run out gives a measure of the viscosity.

The magnitude of the reversible thixotropic properties of a drilling fluid or a measure of the gel or gel strength of the drilling fluid may be determined according to standardized procedures with an instrument known as a shearometer or with a Stormer viscosimeter. In this specification, measurement of gel strength given is from shearometer determination. The methods by which these properties may be measured with a shearometer are described in "Recommended Practice on Field Procedure for Testing Drilling Fluids" A. P. I. Code No. 29, second edition, published July 1942, page 13.

Rotary drilling fluids which have inadequate gel strength are highly susceptible to operational difficulties arising from the settling of suspended cuttings or weighting agents from the fluid when fluid circulation has been temporarily stopped. The settled cuttings bridge the space between the drill stem and the borehole face, thereby preventing the drill stem from turning freely and sometimes resulting in twisting off the drill stem. Expensive fishing jobs are necessary in such an event and in extreme cases the well must be abandoned. Such dangerous and expensive conditions are eliminated by using the drilling fluids of this invention in which even in heavily weighted fluids both the weighting agents and the suspended cuttings have remained virtually in complete suspension for periods up to 72 hours and longer when circulation of the fluid was halted. These improved oil-base drilling fluids therefore possess many advantages heretofore unobtainable with oil-base drilling fluids previously proposed.

The emulsifying and wall building agents employed in preparing the improved drilling fluids of this invention comprise metal soaps of organic acids. Preferably the combination of a water-dispersible and an oil-dispersible soap is employed, although in some instances the oil-dispersible soap alone may be used. A water suspension containing a minor but effective proportion of a hydratable clay may be employed in conjunction with the above-mentioned preferred emulsifying agent to assist in improving the emulsion stability of the drilling fluid and in reducing the filtration rate thereof. In some instances the quantity of water may be reduced to very low values such as less than 1% by weight, and the quantity of hydratable clay may be reduced to zero. In one modification, the oil phase of these improved drilling fluids may comprise a heavy oil which contains unsaturated constituents including olefinic and aromatic hydrocarbon compounds to which the clay, soap, and the hereinafter described basically reacting compound are directly added. It is preferred that the emulsifying agent comprising the combination of oil- and water-dispersible soaps be prepared by the metathesis of the water-dispersible soap with a basically-reacting alkaline-earth metal compound to effect at least a partial conversion of the water-dispersible soap to an oil-dispersible soap.

The oils employed in compounding the improved drilling fluids of this invention may comprise a combination of a light mineral oil with a heavy mineral oil. The light oil used is preferably one boiling between about 300° F. and 760° F. such as gas oil, kerosene, diesel fuel, and the like. The preferred heavy oil is normally liquid having a gravity of between about 10.0° and 25.0° A. P. I., the major proportion of which boils above about 760° F. These heavy oils desirably contain a substantial proportion of high molecular weight normally liquid unsaturated constituents including olefinic and/or aromatic molecules such as are present in cracked residuums, cracked fuel oils, petroleum extracts, and the like, having viscosities in the range of from 20 to 100 S. S. F. at 122° F. Heavy oils containing substantial quantities of combined sulfur have been found applicable. The oils employed in preparing these improved drilling fluids are preferably mineral oils, although oils from other sources may be employed. Oil fractions obtained in the distillation of coal during coking operations are applicable as are shale oil fractions, and the like.

A minor proportion of a hydratable clay such as Wyoming bentonite may be incorporated into the drilling fluids of this invention and serve the purpose of improving the stability of the emulsion and the suspension of weighting agents which may be added, if required. Since the quantity of hydratable clay thus incorporated is very minor, e. g., from about 0.1% to about 5.0% by weight, it does not serve the purpose of a weighting agent since the addition of the hydratable clay results in an immeasurably low increase in the specific gravity of the drilling fluid. A substantial increase in the stability of the emulsion, however, is effected.

A highly important ingredient in the improved drilling fluid preparation is the agent employed to impart emulsion stability and desirable wall sealing properties to the fluid. This agent preferably comprises the combination of a water-dispersible and an oil-dispersible soap of an unsaturated cyclic organic acid. The most desirable soaps are prepared from the unsaturated cyclic acids such as the rosin acids or tall oil acids. Soaps prepared from saturated cyclic acids such as naphthenic acids may be employed if the preferred rosin acids are not available, although the results are not as good. The preferred soaps may be made through direct neutralization of natural rosins, gums, or other materials containing substantial quantities of such acids as abietic acid and abietic anhydride. It is preferred that the water-dispersible soaps of these acids be employed such as the ammonium or alkali metal soaps, since such soaps are readily metathesized by the action of basically reacting alkaline-earth metal compounds to cause at least a partial conversion to oil-dispersible soaps of these acids. Basically reacting salts and the oxides or the hydroxides of the alkaline earth metals may be thus employed. The quantity employed may be as high as two equivalents of the basically reacting alkaline-earth metal compound per equivalent of water-dispersible soap to be metathesized, and is preferably less. Desirable fluids are formed when equivalent quantities of soap and basically reacting metal compound are added. The emulsifying agent preferred in these drilling fluids comprises a mixture of a sodium water-dispersible soap and a calcium oil-dispersible soap of rosin acids so prepared.

The gelation agents which are added in minor but effective proportions to the improved drilling fluids of this invention to impart the properties of reversible thixotropy are water-soluble salts of inorganic oxygen-containing acids. The anions of these salts are those of metals of groups IV, V, and VI of the periodic table, the lower-molecular weight metals such as those having a molecular weight less than about 100 being preferred. The water-soluble carbonates, silicates, and plumbates of group IV are desirable, especially the first two of these salts. From group V metal anions, the phosphates and vanadates have been found suitable and the antimonates to a lesser degree. The alkali metal phosphates, such as sodium pyrophosphate, give limited gel strength increases. The chromates, dichromates, molybdates, and tungstates from group VI metals have also been found applicable to imparting gel strength to the drilling fluids of this invention. The preferred anions are carbonate, silicate, and chromate in the form of their salts of strong bases such as ammonia or the alkali metals. In some cases alkaline earth metal salts may be employed. In addition to increasing gel strength, these salts have been found highly desirable in increasing the viscosity of the drilling fluid when high temperature conditions are encountered during deep drilling and also to impart desirable gel strength properties. A 40% aqueous solution of sodium silicate or commercial water glass introduced into the improved drilling fluid of this invention to a concentration of less than 1% by weight has permitted the formulation of an oil-base drilling fluid which stood in a well bore without circulation for a period of 72 hours with substantially no settling of suspended particles.

The quantity of gelation agent incorporated during the preparation of the improved drilling fluids of this invention is quite low. Highly desirable thixotropic properties have been obtained with as low as about 0.01% to as high as about 5.0% by weight of the active ingredient. Drilling fluids containing less than 1.0% by weight of the active ingredient have been found to have good gel strengths.

The gelation agent may be introduced into the fluid during any stage of its preparation, such as at the beginning with the water-dispersible soap or at the end after all the heavy oil has been added. In general, it is desirable to add the gelation agent in the form of an aqueous solution or slurry, the concentration of which may be selected after consideration of the quantity of water which is desirable in the final product. The alkali metal silicates are conveniently added as 40% by weight aqueous solutions of 1.39 specific gravity (11.6 pounds per gallon). The other gelation agents may be also added as dilute or concentrated solutions or slurries.

In order to obtain the highly desirable drilling fluids from the ingredients enumerated above, it is desirable that a special procedure of mixing and compounding be followed. In the one modification of mixing, the following order is employed:

Step 1

The total amount of light oil required in the batch of drilling fluid is added to a container and the basically reacting alkaline-earth metal compound required for metathesis is added. This basically reacting metal compound may be introduced as a finely divided solid, as an aqueous solution, or as an aqueous or oil slurry. The resulting mixture is thoroughly agitated.

Step 2

All of the metathesizable water-dispersible soap is added to the material formed in Step 1 and mixed thoroughly. When water is introduced with the ingredients in Step 1 the mixture resulting from Step 2 is an emulsion.

Step 3

When used, the hydratable clay is next added as a dry powder or as an aqueous suspension to the material formed in Step 2 and the resulting mass is thoroughly agitated to form a homogeneous emulsion.

Step 4

To this emulsion is then slowly added the heavy oil with heavy agitation until a uniform homogeneous system results.

Step 5

To this system is then added the gelation agent preferably as an aqueous solution to be thoroughly agitated into the system.

In another mixing procedure for quick formulation of the fluid, the light oil is not added as such, but a heavy oil contining about 5.0% by volume of gas oil is employed. The following order is employed:

Step A

A small fraction, about 10% by volume, for example, of the heavy oil to be employed in the final fluid is removed from a storage tank and is introduced into a mixing tank.

Step B

All of the basically reacting metal compound, the water-dispersible soap, hydratable clay, and gelation agents, if desired, and water are added to the heavy oil in the mixing tank and circulated to form a uniform system. This may require from about 20 to 60 minutes.

Step C

The mixture formed in Step B is pumped into the storage tank containing the remaining quantity of heavy oil and is circulated to form a homogeneous emulsion. The gelation agents and weighting agents may be added during this step, if desired.

To add weighting agents to a finished unweighted fluid, it is preferable to pump part of the fluid into the mixing tank, add the gelation agent, followed by sufficient quantity of weighting agent for the total quantity of fluid, circulate to a homogeneous mixture, and circulate the heavily weighted fraction of the fluid into the storage tank to form the finished weighted fluid.

By following the procedure of mixing given above, the basically reacting alkaline-earth metal compound in the presence of water interacts with and metathesizes the sodium water-dispersible soap. The degree with which the metathesis is completed is largely dependent upon the ratio of equivalents of metathesizable soap to basically reacting metal compound and the resulting constituents generally include part of the water-dispersible soap which was unmetathesized together with an oil-dispersible soap formed by the metathesis together with basically reacting products formed during the metathesis. This combination of emulsifying agents effects a thorough emulsification of the clay or clay-water suspension with the oils to form the drilling fluid. Should the clay be added as a dry powder and the gelation agent added with a minimum of water, a drilling fluid may be formed which contains less than 1.0% of water largely introduced with the soaps and other ingredients.

Desirable drilling fluids may be formed without the addition of water as such and the amount of water present in soaps, oils, or other agents added forms a stable water-in-oil emulsion as a desirable drilling fluid. The introduction of the gelation agent, such as for example, an alkali metal silicate, carbonate, or chromate into the drilling fluid results in the formation of an emulsion showing high viscosities at low rates of shear and low viscosities in the desirable drilling fluid range when the emulsion is agitated as normally occurs at the top of the well in the slush pits and settling troughs.

In the preferred modification of the drilling fluid the water-dispersible component of the emulsifying agent is an alkali metal rosin acid soap such as sodium resinate and the basically reacting alkaline-earth metal compound is preferably calcium hydroxide or commercial hydrated lime. The oil-dispersible soaps resulting from this metathesis in the preferred modification comprise calcium resinates in conjunction with sodium resinates which apparently assist in the oil dispersion of the calcium soaps. The combination is believed to be responsible for the formation of an emulsified oil-base drilling fluid having highly desirable filtration rates and viscosity characteristics. The addition of the gelation agents given above impart to the drilling fluid the highly desirable gel strength properties. This water-in-oil emulsion drilling fluid has proved unusually satisfactory both in laboratory testing and actual field practice and highly superior with regard to gel strength properties to other oil-base drilling fluids employed.

Typical specifications of the improved oil-base drilling fluids of this invention are given below:

| Tests | Specifications | | Typical Data |
|---|---|---|---|
| Appearance | Black Liquid | | Black Liquid |
| | Min. | Max. | |
| Fluid Weight, lbs. per cu. ft | 59.4 | -------- | 59.7 |
| Viscosity at 80° F., 1500/1-qt | 250 | 350 | 280 |
| Fluid loss, 15 minutes | -------- | 2 | 0.2 |
| Water, ASTM, per cent by weight | -------- | -------- | 4.5 |

The quantity of light oil employed in preparing the improved drilling fluid may vary from as low as 1.0% by weight to as high as about 25.0% by weight or higher, while the cracked heavy oil containing olefinic or aromatic or other unsaturated types of hydrocarbons may vary in the major proportion of the oil phase from as low as about 40.0% by weight or lower to as high as about 95% by weight. In the drilling of deep wells such as between 4,000 and 10,000 feet, and especially at high drilling rates the viscosity of the drilling fluid may decrease appreciably since the fluid temperature increases while in use. The temperature of the fluid flowing from the well into the settling pits may be between about 80° F. and as high as 130° F. In order to maintain the viscosity in the preferred range such as between about 120 and 150 Marsh seconds (1500/1-qt.) at the temperature at which the fluid is used, the relative amounts of light oil and heavy oil present in the fluid may be varied. It is sometimes desirable to eliminate the light oil all together and prepare the drilling fluid exclusively from the heavy oil. It is preferable, however, in most cases that the heavy oil be incorporated in amounts varying between about 60.0% to 80.0% by weight and that this heavy oil be normally liquid and possess a viscosity in the range of from 20 to 40 S. S. F. at 122° F. Under these conditions it is preferable to employ between about 10% and about 15% by weight of light oil in the drilling of wells to depths of about 6,000 feet. The quantity of gelation agent added to such fluids may be varied from as low as 0.01% to as high as about 5.0% by weight of active ingredient to impart gel strength properties to the fluid. Especially successful fluids have been obtained using between 0.1% and 0.8% by weight of the gelation agent.

When used, the quantity of hydratable clay incorporated in the drilling fluids of this invention is preferably about 0.5% by weight, although satisfactory fluids may be formulated using as low as about 0.1% to as high as about 5.0% by weight of clay. The water content of these drilling fluids is variable from as low as about 0.05% to as high as about 10.0% by weight and may be added as such during drilling fluid preparation or may be present merely in the soaps, oils, or other ingredients employed. Especially good drilling fluids have been obtained in which the water content was 1.0% or less. The quantity of emulsifying agents added as the water-dispersible rosin acid soaps is preferably around 5.0% by weight. However, quantities as low as about 0.1% by weight or less to as high as about 10% by weight may be used. The quantity of hydrated lime or other source of basically reacting alkaline-earth metal compound to form oil-dispersible rosin acid soaps by metathesis of the water-dispersible sodium rosin acid soaps is preferably sufficient to permit at least a partially complete metathesis. A mixture of oil-dispersible and water-dispersible rosin acid soaps as the emulsifying agent results. It is indicated that the presence of the water-dispersible sodium rosin acid soaps materially assists in dispersing the calcium rosin acid soaps in the system. When about 5.0% by weight of sodium rosin soap is employed, 1.0% to 1.5% by weight of hydrated lime has been proved satisfactory to effect the desired metathesis.

The quantities of individual constituents involved in the preparation of a typical drilling fluid and the magnitude of the gel strengths of fluids prepared according to this invention, may be obtained by reference to the following examples:

Example I

An experimental oil well was drilled in the Dominguez Field of Southern California in which the improved drilling fluids of this invention were employed. The well had been drilled to a depth of 5417 feet with a conventional water-base drilling fluid and at that depth about 550 barrels of the improved drilling fluid of this invention were prepared. This quantity of fluid contained about 250 barrels of drilling fluid prepared according to this invention which was employed previously in drilling another well and an additional quantity of about 300 barrels of fluid were then prepared to bring the total volume up to about 550 barrels.

The drilling fluid thus prepared contained the following ingredients:

| Ingredient | Pounds | Pounds Per Barrel | Per Cent By Weight |
| --- | --- | --- | --- |
| Light Domestic Fuel Oil and previously used fluid | 156,000 | | 79.5 |
| Sodium Resinate Soap | 5,000 | 10.2 | 2.5 |
| Commercial Hydrated Lime | 700 | 1.4 | 0.35 |
| Water | 700 | 1.4 | 0.35 |
| Bentonite | 300 | 0.6 | 0.15 |
| Whiting (Through 400 mesh calcium carbonate) | 32,500 | 66 | 16.6 |
| Commercial "Water" Glass (40% aqueous solution) | 1,100 | 2.3 | 0.55 |
| Total | | | 100.00 |

This drilling fluid had a Marsh viscosity 1500/1-qt. of 157 seconds at 115° F. which was determined during actual drilling. The weight of the fluid was 70 pounds per cubic foot and showed very little variation from that figure during drilling. The improved drilling fluid thus prepared was used to replace the water-base mud in the hole and the bore was reamed from a depth of 5222 feet to 5372 feet. At this depth a cement plug was drilled through and circulation was stopped while the bit was changed. Cutting through the cement plug exerted no adverse influence upon the physical properties of the drilling fluid. During the period that the bit was being changed there was no evidence of separation of the whiting which was employed as a weighting agent, and when circulation was begun samples of the fluid taken at the top of the well indicated no evidence of settling. The bore was subsequently drilled to a total depth of 5725 feet. During this last drilling at one point a total depth of 25 feet of hole in 40 minutes was made. The hole was subsequently reamed to the bottom, logged, and after setting a liner was put on production. The production rate of this well compared very favorably with those in its vicinity. During drilling the cuttings broke cleanly from the fluid on the shaker screen. Some gas cutting was evidenced but this broke easily from the fluid and no trouble was encountered during the operation. The filtration rate of this drilling fluid varied only slightly from the value of 0.5 ml. per hour.

The effect of the use of commercial water glass solutions (sodium silicate) on the viscosity and gel strength may be seen from the following example:

Example II

A drilling fluid according to this invention was prepared by metathesizing 4.0% by weight of sodium resinate with 1.5% by weight of commercial hydrated lime in the presence of diesel oil and water. Subsequently light domestic fuel oil was agitated into the above mixture to form a black homogeneous emulsion containing about 70% by volume of the fuel oil. The Marsh viscosity, 1500/1-qt., two hours after preparation was 92 seconds. After standing for a period of 48 hours the Marsh viscosity was found to be 92 seconds again. The thirty minute gel strength measured by a shearometer was found about 0.1 pounds per 100 square feet.

Example III

The addition of 1.5% by weight of a 40.0% aqueous solution of sodium silicate to the drilling fluid prepared as in Example II resulted in a fluid having a two hour Marsh viscosity 1500/1-qt. of 120 seconds, a 220 second viscosity at the end of 48 hours, a 10 minute gel strength of two pounds per 100 square feet and a 30 minute gel strength of three pounds per 100 square feet. The gel strengths were measured by a shearometer as in Example II. Other alkali metal or ammonium silicate may be used.

Example IV

The incorporation of 1.5% by weight of a 40.0% aqueous suspension of sodium carbonate in the drilling fluid prepared as in Example II resulted in a smooth homogeneous drilling fluid having improved gel strength properties. The Marsh viscosity 1500/1-qt. at the end of two hours was found to be 124 seconds and at the end of 48 hours was found to be 200 seconds. The shearometer gel strength at 10 minutes was found to be three pounds per 100 square feet, and at the end of 30 minutes the gel strength had risen to six pounds per 100 square feet. Other alkali metal or ammonium carbonates may be used.

*Example V*

To an oil-base drilling fluid prepared as in Example II, 1.5% by weight of a 40% aqueous potassium chromate solution was added. A smooth homogeneous drilling fluid resulted which had a Marsh viscosity 1500/1-qt. of 100 seconds at the end of two hours and 205 seconds at 48 hours. The 30-minute shearometer gel strength was found to be three pounds per 100 square feet. Other alkali metal or ammonium chromates may be used.

*Example VI*

A 230 barrel batch of improved drilling fluid may be prepared from 220 barrels of light domestic fuel oil (cracked). The fuel oil is placed in a storage tank and 22.5 barrels are withdrawn and placed in a mixing tank, barge, or other vessel. To the mixing tank is then added 3,180 pounds of commercial sodium resinate soap, 320 pounds of hydrated lime (1 to 1 equivalent ratio with the soap), 400 pounds of Wyoming bentonite, and 400 pounds of water. The fluid is circulated for not less than 20 minutes and preferably for about one hour to form a well mixed liquid. This fluid may then be thoroughly mixed by circulation with the remaining 207.5 barrels of fuel oil to form a satisfactory drilling fluid for ordinary drilling conditions having a weight of about 61 pounds per cubic foot.

The addition of gelation agents and weighting materials may be made as follows: A 40-barrel volume of the drilling fluid is introduced into the mixing tank and 15 gallons of a 40% by weight aqueous solution of commercial water glass (sodium silicate) and 10,960 pounds of whiting (425 mesh calcium carbonate) are added to form a 90 pound per cubic foot fluid. This amounts to the addition of 274 pounds of whiting per barrel of fluid. This weighted mixture is then pumped into the remaining 190 barrels of unweighted fluid and circulated until a smooth homogeneous mixture is achieved. For increasing viscosity and gel strength of the fluid as desired during drilling, small additional quantities of the gelation agent may be added. A decrease in viscosity may be easily effected by addition of light oil such as diesel fuel to the mud stream.

The drilling fluids as herein described are such that stable fluids are formed when weighting agents such as insoluble inorganic compounds of the heavy metals including barium sulfate, barium carbonate, ferric oxide or red pigment, plumbic oxide or litharge, galena, silica, pulverized oyster shells, or other similar materials are used. By incorporation of these agents in the oil-base drilling fluids described above, fluid weights considerably greater than 60 pounds per cubic foot may be formed.

Some modification may be made in the selection of the so-called heavy oil which is the light domestic fuel oil of Example I. The important consideration in heavy oil selection is that it must contain high molecular weight olefinic or aromatic hydrocarbons, or both, and must be relatively free from normally solid hydrocarbon or hydrocarbon-like materials such as asphalt. It may contain considerable quantities of combined sulfur. These high molecular weight olefinic or aromatic materials serve as suitable wall forming or wall sealing agents in the hole only when they are properly dispersed or combined with a light oil having certain characteristics. This has been demonstrated by A. P. I. Code 29 filtration and viscosity tests. As alternates for cracked fuel oil, such materials as straight run fuel oil, and the like, which fulfill the requirements given above for the heavy oil may be used.

As indicated above, the quantity of the light oil or modifying oil, the gas oil or diesel fuel of the above examples, depends upon the source and the nature of the heavy oil employed and the physical characteristics of the fluid product desired. For example, if a very heavy liquid hydrocarbon is employed a relatively aromatic light oil is desirable. Relatively aromatic light oils are characterized by high aniline point, high V. G. C. or low viscosity index. If a lower molecular weight heavy oil is employed, a light oil which is less aromatic and having a lower aniline point, a lower V. G. C. or higher V. I. should be employed. With some heavy oils such as the light domestic fuel oil of the above example, no added light oil may be required since the fuel oil may contain some lighter oil. The important consideration is that the wall sealing properties of the drilling fluid may be controlled by the proper selection of light oil and heavy oil combination.

The soaps employed in the formation of the emulsion present in the improved drilling fluids of this invention are of considerable importance. The cationic constituents of the soaps employed may be selected from the group consisting of the alkali metals and ammonium for the water-dispersible soaps, and basically reacting compounds of the alkaline-earth metals, such as the oxides, hydrated oxides, or hydroxides of calcium, barium, strontium and magnesium may be employed to metathesize a portion of the water-dispersible soap for the formation of the oil-dispersible soap. The use of calcium as the cationic constituent is preferred. The preferred anions comprise the rosin acids, and while other constituents such as the naphthenic, fatty carboxylic, and sulfonic acids may be used, the results obtained are not as satisfactory and are listed above in decreasing order of effectiveness as emulsifying and filter loss rate reducing agents.

Although it is preferred to form the oil-dispersible soap in situ by adding a basically reacting alkaline-earth metal compound, the oil-dispersible soaps may be prepared separately and added during the preparation of the drilling fluid with substantially the same desirable results.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A drilling fluid composition for drilling oil and gas wells comprising from about 40 to about 95 per cent by weight of mineral oil, from about 0.05 to about 10 per cent by weight of water, from about 0.1 to about 10 per cent by weight of an oil-dispersible metal soap, and from about 0.01 to about 5 per cent by weight of a water-soluble salt of a strong base and a weak inorganic acid, said water and oil forming an oil-external emulsion stabilized by the presence of said soap, and said water-soluble salt of a strong base and a weak inorganic acid imparting gel strength properties to the composition.

2. A drilling fluid composition for drilling oil and gas wells comprising from about 40 to about 95 per cent by weight of mineral oil, from about 0.05 to about 10 per cent by weight of water, from about 0.1 to about 10 per cent by weight of a soap mixture comprising substantial proportions each of a water-dispersible metal soap and an oil-dispersible metal soap, and from about 0.01 to about 5 per cent by weight of a water-soluble salt of a strong base and a weak inorganic acid, said water and oil forming an oil-external emulsion stabilized by the presence of said soap mixture, and said water-soluble salt of a strong base and a weak inorganic acid imparting gel strength properties to the composition.

3. A composition according to claim 2 wherein the water-dispersible soap is an alkali-metal rosin acid soap and the oil-dispersible soap is an alkaline earth metal rosin acid soap.

4. A composition according to claim 2 wherein the soap mixture is the product obtained directly by reaction between an alkali-metal rosin acid soap and sufficient aqueous hydrated lime to metathesize a substantial proportion of said alkali-metal rosin acid soap.

5. A composition according to claim 2 wherein the water-soluble salt of a strong base and a weak acid is an alkali-metal silicate.

6. A composition according to claim 2 wherein the water-soluble salt of a strong base and a weak acid is an alkali-metal carbonate.

7. A composition according to claim 2 wherein the water-soluble salt of a strong base and a weak acid is an alkali-metal chromate.

8. A drilling fluid composition comprising the composition defined by claim 2 having suspended therein sufficient of an inorganic weighting material to increase the density of the composition to a value above about 60 pounds per cubic foot.

9. A composition according to claim 2 wherein the water-dispersible soap is an alkali-metal rosin acid soap and the oil-dispersible soap is an alkaline-earth metal soap, and the water-soluble salt of a strong base and a weak inorganic acid is sodium silicate.

10. A composition according to claim 2 wherein the soap mixture is the product obtained directly by reaction between an alkali-metal rosin acid soap and sufficient aqueous hydrated lime to metathesize a substantial proportion of said alkali-metal soap, and the water-soluble salt of a strong base and a weak inorganic acid is sodium silicate.

11. A drilling fluid composition for drilling oil and gas wells comprising from about 40 to about 95 per cent by weight of a mineral oil, from about 0.05 to about 10 per cent by weight of water, from about 0.1 to about 5 per cent by weight of a hydratable clay, from about 0.1 to about 10 per cent by weight of a soap mixture comprising substantial propotions each of a water-dispersible metal soap and an oil-dispersible metal soap, and from about 0.1 to about 5 per cent by weight of a water-soluble salt of a strong base and a weak inoganic acid, said water and oil forming an oil-external emulsion stabilized by the presence of said soap mixture and said hydratable clay, and said water-soluble salt of a strong base and a weak inorganic acid imparting gel strength properties to the composition.

12. A composition according to claim 11 wherein the water-dispersible soap is an alkali-metal rosin acid soap and the oil-dispersible metal soap is an alkaline earth metal rosin acid soap.

13. A composition according to claim 11 wherein the soap mixture is the product obtained directly by reaction between an alkali-metal rosin acid soap and sufficient of an aqueous alkaline earth metal base to metathesize a substantial proportion of said alkali-metal rosin acid soap.

14. A composition according to claim 11 wherein the water-soluble salt of a strong base and a weak inorganic acid is an alkali-metal silicate.

15. A composition according to claim 11 wherein the water-soluble salt of a strong base and a weak inorganic acid is an alkali-metal carbonate.

16. A composition according to claim 11 wherein the water-soluble salt of a strong base and a weak inorganic acid is an alkali-metal chromate.

17. A composition according to claim 11 wherein the water-soluble salt of a strong base and an inorganic weak acid is sodium silicate.

18. A composition according to claim 11 wherein the mineral oil comprises a mixture of a light mineral boiling between about 300° F. and about 760° F. and a heavy mineral oil having a specific gravity between about 10.0° and about 25.0° A. P. I. and containing a substantial proportion of high molecular weight normally liquid unsaturated constituents.

19. A drilling fluid composition comprising the composition defined by claim 11 having suspended therein sufficient of an inorganic weighting agent to increase the density of the composition to a value above about 60 pounds per cubic foot.

PAUL W. FISCHER.

REFERENCES CITED

The following references are of record in the file of this patent:

UNITED STATES PATENTS

| Number | Name | Date |
|---|---|---|
| 2,099,825 | Rolshausen et al. | Nov. 23, 1937 |
| 2,223,027 | Dawson et al. | Nov. 26, 1940 |
| 2,350,154 | Dawson et al. | May 30, 1944 |
| 2,430,039 | Anderson | Nov. 14, 1947 |
| 2,461,483 | Self | Feb. 8, 1949 |
| 2,475,713 | Miller | July 12, 1949 |
| 2,488,304 | Malott | Nov. 15, 1949 |
| 2,497,398 | Dawson | Feb. 14, 1950 |
| 2,509,588 | Dawson | May 30, 1950 |

FOREIGN PATENTS

| Number | Country | Date |
|---|---|---|
| 803,828 | France | July 20, 1936 |